(12) United States Patent
Ogihara et al.

(10) Patent No.: US 8,390,760 B2
(45) Date of Patent: Mar. 5, 2013

(54) PLANAR LIGHT-EMITTING DEVICE AND LIQUID CRYSTAL DISPLAY APPARATUS USING THE SAME

(75) Inventors: Takeshi Ogihara, Fujiyoshida (JP); Daisaku Okuwaki, Fujiyoshida (JP); Makoto Yasuhara, Yamanashi-ken (JP); Taku Kumasaka, Tsuru (JP)

(73) Assignees: Citizen Electronics Co., Ltd., Yamanashi-ken (JP); Citizen Holdings Co., Ltd., Tokyo (JP)

( * ) Notice: Subject to any disclaimer, the term of this patent is extended or adjusted under 35 U.S.C. 154(b) by 685 days.

(21) Appl. No.: 12/630,187

(22) Filed: Dec. 3, 2009

(65) Prior Publication Data

US 2010/0141867 A1  Jun. 10, 2010

(30) Foreign Application Priority Data

Dec. 5, 2008 (JP) ................................. 2008-310820

(51) Int. Cl.
*G02F 1/1335* (2006.01)

(52) U.S. Cl. .............................. 349/61; 349/64; 349/113

(58) Field of Classification Search .............. 349/61–64, 349/113
See application file for complete search history.

(56) References Cited

U.S. PATENT DOCUMENTS

| 7,072,096 | B2 * | 7/2006 | Holman et al. ............... 359/298 |
| 2006/0104061 | A1 * | 5/2006 | Lerner et al. .................. 362/249 |
| 2009/0244439 | A1 * | 10/2009 | Hamada ......................... 349/61 |

FOREIGN PATENT DOCUMENTS

JP 2007-157451 6/2007

* cited by examiner

*Primary Examiner* — Huyen Ngo
(74) *Attorney, Agent, or Firm* — Wenderoth, Lind & Ponack, L.L.P.

(57) ABSTRACT

A planar light-emitting device enabling reduction in the deflection of a sheet-shaped light-diffusing element includes a reflector having an upper surface serving as a light-reflecting surface, a partition provided on the reflector to extend upward to form a plurality of enclosed spaces over the upper surface of the reflector, light sources disposed in the enclosed spaces, respectively, and at least one sheet-shaped light-diffusing element supported on the upper edges of the partition to transmit and diffuse light from the light sources upward. The side surfaces of the partition that define the enclosed spaces are light-reflecting surfaces.

16 Claims, 5 Drawing Sheets

PLANAR LIGHT-EMITTING DEVICE AND LIQUID CRYSTAL DISPLAY APPARATUS USING THE SAME

This application claims priority under 35 U.S.C. Section 119 to Japanese Patent Application No. 2008-310820 filed on Dec. 5, 2008, the entire content of which is hereby incorporated by reference.

BACKGROUND OF THE INVENTION

1. Field of the Invention

The present invention relates to a planar light-emitting device that illuminates a liquid crystal display panel or the like. The present invention also relates to a liquid crystal display apparatus using such a planar light-emitting device.

2. Description of the Related Arts

Liquid crystal display apparatuses for image display are widely used as the large-sized displays of flat-screen television systems and monitors, etc. These liquid crystal display apparatuses employ a backlight unit that applies illuminating light to a liquid crystal display panel from the back to enhance the luminance of the display screen. One type of such a backlight unit, for example, has a lightguide plate and a light source comprising, for example, light-emitting diodes (LEDs) disposed adjacent to the peripheral side surface of the lightguide plate. The lightguide plate guides light from the light source and emits the guided light from the whole of a light exiting surface directed toward a liquid crystal display panel. There is another type of backlight unit known as a direct light type that uses no lightguide plate. In the direct light type backlight unit, a plurality of light sources are installed directly below a liquid crystal display panel with a sheet-shaped light-diffusing element, e.g. a diffusing sheet, interposed between the panel and the light sources, and each light source illuminates the liquid crystal display panel through the sheet-shaped light-diffusing element.

Recently, as liquid crystal television systems increase in size, the demand for reduction in weight and thickness of the television systems has been becoming stronger. In this regard, there are some problems to be solved. A backlight unit using a lightguide plate needs to install a large-sized lightguide plate or a plurality of lightguide plates in juxtaposed relation, resulting in an increase in weight. The direct light type backlight unit, which uses no lightguide plate, allows a weight reduction corresponding to the weight of a lightguide plate that would otherwise be used, but needs to set a wide spacing between the light sources and the sheet-shaped light-diffusing element in order to prevent the occurrence of luminance unevenness of illuminating light applied to the liquid crystal display panel.

Japanese Patent Application Publication No. 2007-157451, for example, proposes a backlight unit provided with sheet-shaped light-diffusing element support members in the shape of support posts to support a sheet-shaped light-diffusing element while ensuring a required spacing between the sheet-shaped light-diffusing element and light sources. In this backlight unit, the sheet-shaped light-diffusing element is supported by the upper ends of the support members to separate the light-diffusing element from the light sources. In this related art, however, a thin sheet-shaped light-diffusing element is supported by the tapered ends of the support members. Therefore, the thin light-diffusing element is deflected undesirably. To cope with this problem, a thick sheet-shaped light-diffusing element may be used to suppress the deflection, which, however, would interfere with the reduction in overall thickness and weight of the backlight unit.

SUMMARY OF THE INVENTION

The present invention has been made in view of the above-described circumstances. Accordingly, an object of the present invention is to provide a planar light-emitting device using a thin sheet-shaped light-diffusing element and yet enabling reduction in the deflection of the sheet-shaped light-diffusing element. Another object of the present invention is to provide a liquid crystal display apparatus using the planar light-emitting device of the present invention.

The present invention provides a planar light-emitting device including a reflector having an upper surface serving as a light-reflecting surface and a partition provided on the reflector to extend upward to form a plurality of enclosed spaces over the upper surface of the reflector. The partition having the side surfaces defines the enclosed spaces and are light-reflective. The planar light-emitting device further includes light sources disposed in the enclosed spaces, respectively, and at least one sheet-shaped light-diffusing element supported on the upper edges of the partition to transmit and diffuse light from the light sources upward.

It should be noted that the terms "upper edges", "upward", etc. as employed in the above are used only for explanatory purposes, and that these terms should not be construed as specifying a particular absolute positional relationship between the constituent elements of the planar light-emitting device. The sheet-shaped light-diffusing element is a sheet-shaped element having a light-diffusing function and includes those having various thicknesses. In this planar light-emitting device, the sheet-shaped light-diffusing element can be entirely supported by the upper edges of the partition, and thus the deflection of the sheet-shaped light-diffusing element can be prevented effectively. Accordingly, the sheet-shaped light-diffusing element can be reduced in thickness and increased in size, and the planar light-emitting device can be reduced in overall thickness and weight and increased in overall size, which contributes to the reduction in thickness and weight of a liquid crystal display apparatus using the planar light-emitting device, and which also contributes to the increase in size of the display apparatus. The sheet-shaped light-diffusing element may be supported by the upper edges of the partition through an optical sheet of high light transmittance placed on the partition upper edges. In this planar light-emitting device, the side surfaces of the partition reflect light from the light sources, thus enabling the light from the light sources to be used efficiently. The light sources set in the enclosed spaces, respectively, can be controlled independently of one another, which facilitates local dimming control. The local dimming control can be further facilitated by arranging the enclosed spaces in a matrix.

Specifically, the upper edges of the partition may be disposed in a plane parallel to the upper surface of the reflector. With this arrangement, the sheet-shaped light-diffusing element can be supported by the whole of the upper edges of the partition, and the deflection of the sheet-shaped light-diffusing element can be further reduced.

The planar light-emitting device may have a plurality of mutually spaced projections formed on the upper edges of the partition to support the at least one sheet-shaped light-diffusing element by the projections. With this arrangement, a gap is formed between the sheet-shaped light-diffusing element and the upper edges of the partition at each region between a pair of adjacent projections. Accordingly, the partition structure allows light to reach the regions between the projections and hence can reduce the occurrence of dark spots on the light exiting surface.

The partition may be a single member formed of a white resin. In this case, the partition need not be processed to have reflecting surfaces and can be produced at a reduced cost.

The partition may comprise a plurality of rectangular partition segments combined together to form the enclosed spaces. In this case, the arrangement may be as follows. The rectangular partition segments comprise two groups of rectangular partition segments intersecting one another. At least one of the two groups of rectangular partition segments have notches extending perpendicular to the longitudinal direction of the rectangular partition segments. The other of the two groups of rectangular partition segments are inserted into the notches and thus combined with the one of the two groups of rectangular partition segments in a lattice configuration. With this arrangement, a partition of desired size can be assembled easily by preparing rectangular partition segments of necessary size. The assembled partition can be folded, which allows space saving during transport and storage.

The planar light-emitting device may be arranged as follows. The light sources are disposed on the upper surface of the reflector at the respective centers of the enclosed spaces, and the side surfaces of the partition that define the enclosed spaces are slant surfaces extending from the upper edges of the partition to respective positions on the upper surface of the reflector that are adjacent to the associated light sources. With this structure, the slant side surfaces of the partition reflect light, which is emitted horizontally from the light sources, upwardly. Therefore, it is possible to efficiently use the light from the light sources.

The slant surfaces may be upwardly concave curved surfaces.

The planar light-emitting device may be arranged as follows. The partition has a plurality of rectangular partition segments combined together in a lattice configuration to form the enclosed spaces, and the projections are formed on the mutually intersecting portions of the rectangular partition segments, respectively.

The planar light-emitting device may also be arranged as follows. The partition has a plurality of rectangular partition segments combined together in a lattice configuration to form the enclosed spaces, and the projections are formed respectively at the centers between the intersections of the rectangular partition segments.

In addition, the present invention provides a liquid crystal display apparatus including a liquid crystal display panel and a planar light-emitting device arranged as stated above, which is disposed at the back of the liquid crystal display panel.

DETAILED DESCRIPTION OF THE PREFERRED EMBODIMENTS

Figure 1:
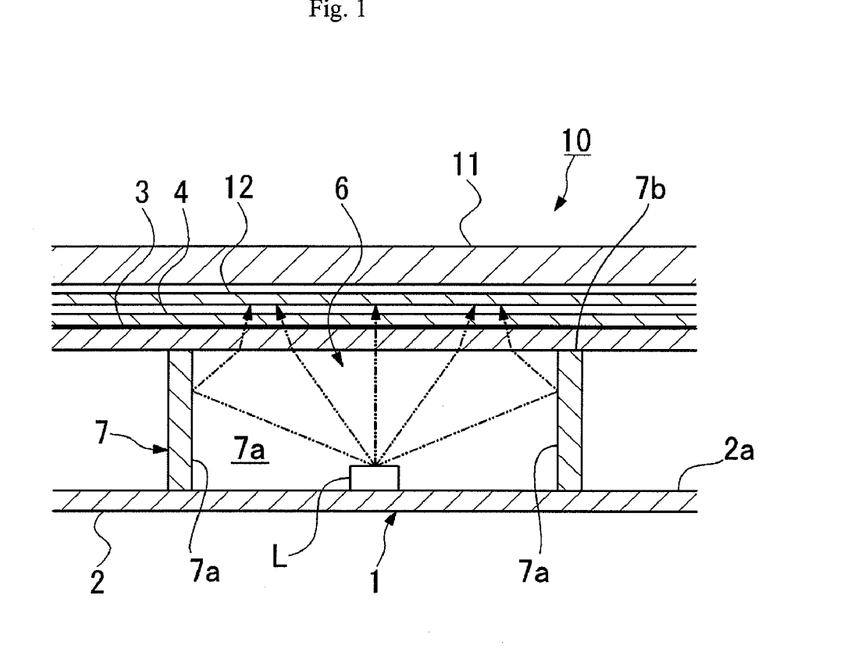
FIG. 1 is an enlarged sectional view of a main part of a liquid crystal display apparatus having a planar light-emitting device according to a first embodiment of the present invention.
Figure 2:
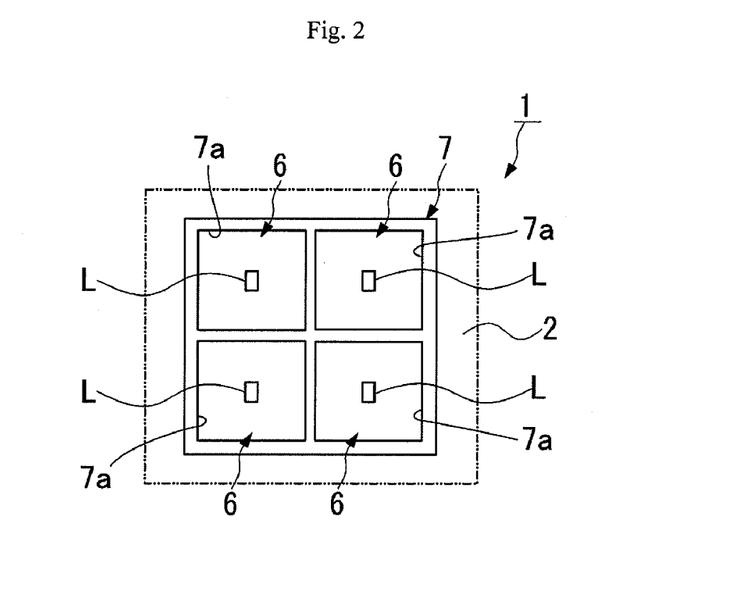
FIG. 2 is a top view showing the planar light-emitting device in FIG. 1, with sheet-shaped light-diffusing elements removed.

FIGS. 1 and 2 show a planar light-emitting device 1 according to a first embodiment of the present invention. The planar light-emitting device 1 has a reflector 2 having an upper surface 2a serving as a light-reflecting surface and a partition 7 installed on the reflector 2 to extend upward to partition the space over the upper surface 2a of the reflector 2 into a plurality of enclosed spaces 6. Side surfaces 7a of the partition 7 that define the enclosed spaces 6 are light-reflecting surfaces. The planar light-emitting device 1 further has light sources L disposed on the upper surface 2a of the reflector 2 at the respective centers of the enclosed spaces 6, and a stack of sheet-shaped light-diffusing elements 3 and 4 supported on the upper edges 7b of the partition 7 to transmit and diffuse light from the light sources L upward.

In the illustrated example, the partition 7 is formed as a single member having a lattice structure by using a white resin having light-reflecting properties, and the enclosed spaces 6 are arranged in a matrix of 2 columns and 2 rows. In this regard, the partition 7 may have a plurality of quadrangular partitions arranged in a matrix to define the enclosed spaces 6, respectively. The partition 7 may have an aspect ratio of 16:9, for example, which is the mainstream aspect ratio for large-sized backlight units.

The partition 7 may be installed; for example, bonded to the upper surface of the reflector 2 through a double-coated adhesive tape or the like. The partition 7 may also be set on the reflector 2 with engaging projections that are provided on the lower edges of the partition 7 fit into engaging recesses that are provided on the reflector 2. In the case of a small-sized backlight unit, the partition 7 may be simply mounted on the reflector 2 without bonding or fitting. The light sources L may be white LEDs, respectively, electrically connected to a flexible printed circuit board (not shown). Each white LED has a light exiting surface directed upward to dispose the optical axis of light from the surface vertically.

The white LED may, for example, be a semiconductor light-emitting element mounted on a substrate and sealed with a sealing resin. The semiconductor light-emitting element is, for example, a blue (wavelength $\lambda$: 470 to 490 nm) LED element or an ultraviolet (wavelength $\lambda$: less than 470 nm) LED element, which is, specifically, formed by stacking a plurality of layers of a gallium nitride compound semiconductor (e.g. InGaN compound semiconductor) on an insulating substrate, e.g. a sapphire substrate. The sealing material sealing the semiconductor light-emitting element may be a resin, for example, as a main component, a silicone resin including a YAG fluorescent substance. The YAG fluorescent substance converts blue or ultraviolet light from the semiconductor light-emitting element into yellow light, and white light is produced by color mixing effect. The white LEDs used in the present invention are not limited to those described above, but various white LEDs are usable.

The sheet-shaped light-diffusing elements 3 and 4 diffuse light from the light sources L to obtain uniform illuminating light to be applied to a liquid crystal display panel 11. The sheet-shaped light-diffusing elements 3 and 4 may each be a plate, sheet or film material made of a transparent resin, e.g. an acrylic or polycarbonate resin, having silica particles or the like dispersed in the resin. The stack of sheet-shaped light-diffusing elements 3 and 4 is supported by the upper edges 7b of the partition 7.

The reflector 2 may be a reflecting sheet bonded to the upper surface of a plate-shaped member through a double-coated adhesive tape or the like. In this embodiment, a white sheet is used as the reflecting sheet. The reflecting sheet may be a metal plate, film, foil or the like having a light-reflecting function, e.g. a film provided with an evaporated silver layer or a film provided with an evaporated aluminum layer.

A prism sheet 12 and a liquid crystal display panel 11 are disposed over the planar light-emitting device 1 to constitute a liquid crystal display apparatus 10. The prism sheet 12 is a transparent sheet-shaped member for directing light from the sheet-shaped light-diffusing element 4 toward the liquid crystal display panel 11. A plurality of mutually parallel prisms are provided on the upper surface of the transparent sheet-shaped member.

The liquid crystal display panel 11 is a transmissive or semitransmissive liquid crystal display panel. In the case of a transmissive type, for example, the liquid crystal display panel 11 has a TFT, STN, TN or other liquid crystal panel body having a liquid crystal material sealed with a sealant in a gap between an upper substrate and a lower substrate, each having a stack of a transparent electrode layer, an alignment film and a polarizer.

In the planar light-emitting device 1 according to the first embodiment, the stack of sheet-shaped light-diffusing elements 3 and 4 is supported by the upper edges 7b of the partition 7. Therefore, the sheet-shaped light-diffusing elements 3 and 4 can be prevented from being deflected and hence can be reduced in thickness and weight. Accordingly, it is possible to reduce the overall thickness of the planar light-emitting device 1.

Further, because the side surfaces 7a of the partition 7 reflect light from the light sources L, the liquid crystal display apparatus 10 can efficiently use light from the light sources L. The partition 7 is formed of a white resin and therefore can reflect light efficiently without the need to carry out a special processing such as forming reflecting surfaces on the partition 7. The partition 7 may be a combination of a plurality of quadrangular partition members. It is, however, possible as stated above to reduce the component cost and the number of assembling steps by forming the partition 7 as a single member by molding.

Further, because a plurality of light sources L are set in the enclosed spaces 6, respectively, which are arranged in a matrix on the partition 7, the light sources L can be driven individually and hence local dimming can be readily carried out. For example, local dimming may be performed by controlling each of the light sources L according to the luminance, contrast and so forth of each area of an image displayed on the liquid crystal display panel 11. By so doing, it is possible to reduce the power consumption and to improve the contrast, the moving picture performance, etc.

Accordingly, the liquid crystal display apparatus 10 using the planar light-emitting device 1 as a backlight unit is lightweight and thin and yet capable of displaying an image of large area with high luminance uniformity.

Next, planar light-emitting devices according to second to fifth embodiments of the present invention will be explained with reference FIGS. 3 to 8. In the following explanation of each embodiment, the same constituent elements as those in the foregoing first embodiment are denoted by the same reference numerals as used in the first embodiment, and a detailed description of the same constituent elements is omitted.

Figure 3:
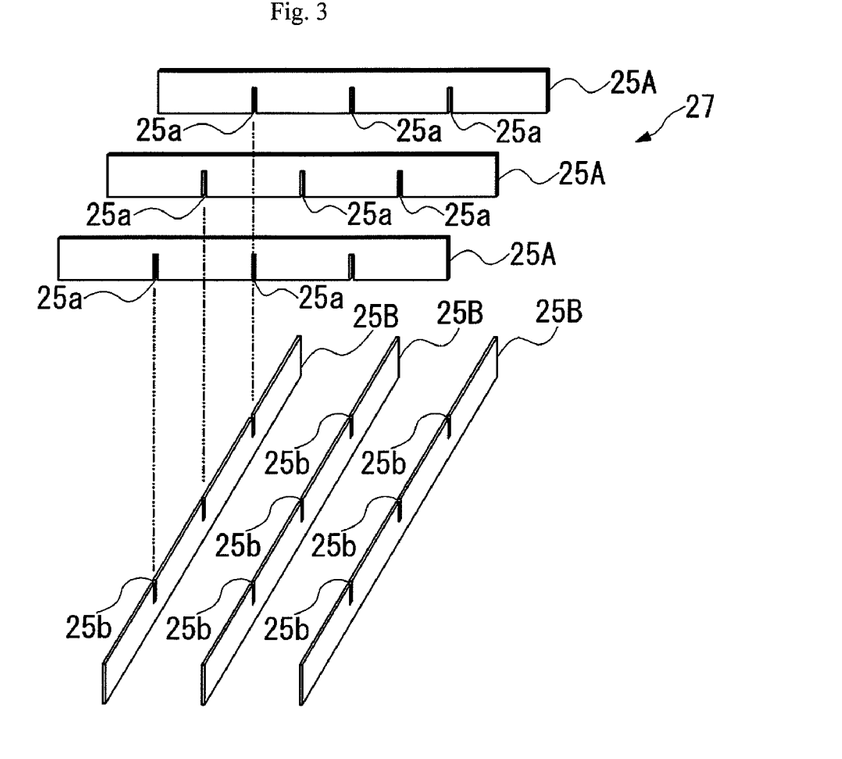
FIG. 3 is an exploded perspective view of a partition used in a planar light-emitting device according to a second embodiment of the present invention.
Figure 4:
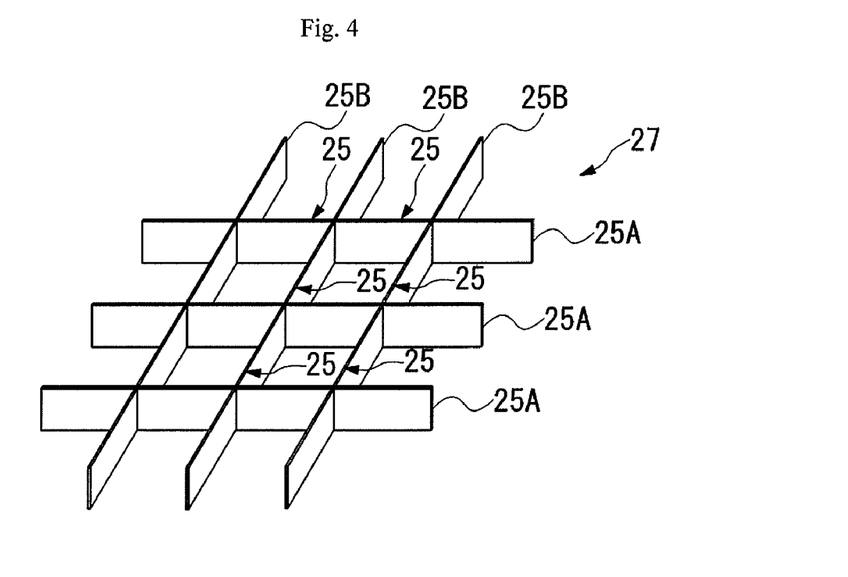
FIG. 4 is a perspective view of the partition shown in FIG. 3.
Figure 5:
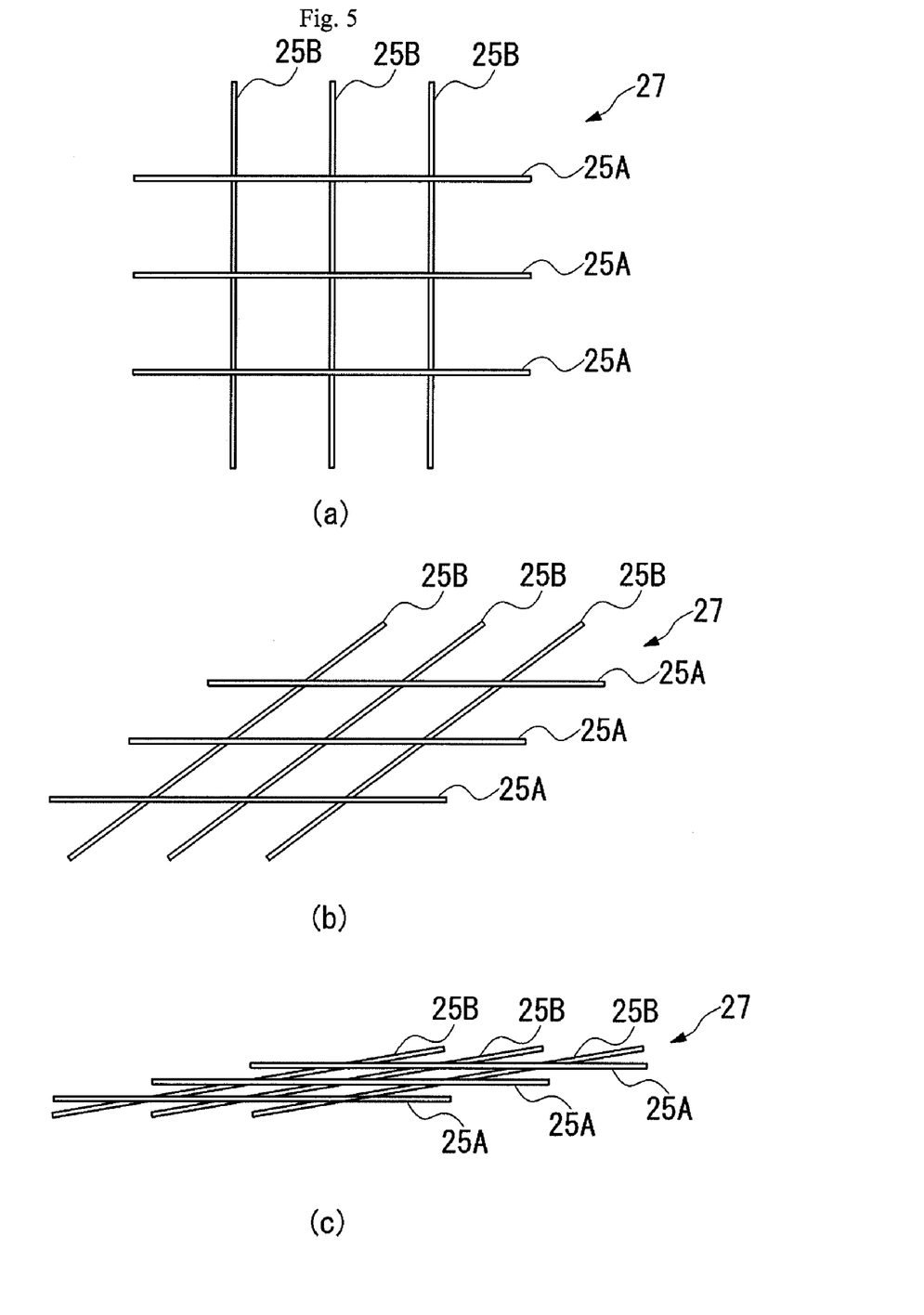
FIG. 5 is a diagram showing the partition in FIG. 3, of which: part (a) is a top view; part (b) is a top view showing the partition that is in the course of being folded; and part (c) is a top view showing the partition in the state of having been folded.

FIGS. 3 to 5 show a partition 27 according to a second embodiment of the present invention. The partition 27 is formed by combining together a plurality of rectangular partition segments 25A and 25B in a matrix.

The rectangular partition segments 25A and 25B intersecting one another have a plurality of notches 25a and 25b, respectively, formed at a predetermined regular spacing. The notches 25a and 25b extend perpendicular to the longitudinal direction of the partition segments 25A and 25B. The partition segments 25A and 25B are inserted into one another's notches 25b and 25a and thus assembled in a lattice configuration. In the assembled state, the tops and bottoms of the partition segments 25A and 25B are flush with one another, respectively. Accordingly, the assembled partition 27 has a uniform height throughout. Thus, a partition of desired size can be formed easily by preparing a plurality of rectangular partition segments 25A and 25B of necessary size. The partition segments 25A and 25B assembled in a lattice configuration can be folded as shown in parts (a), (b) and (c) of FIG. 5, which allows space saving during transport and storage.

Figure 6:
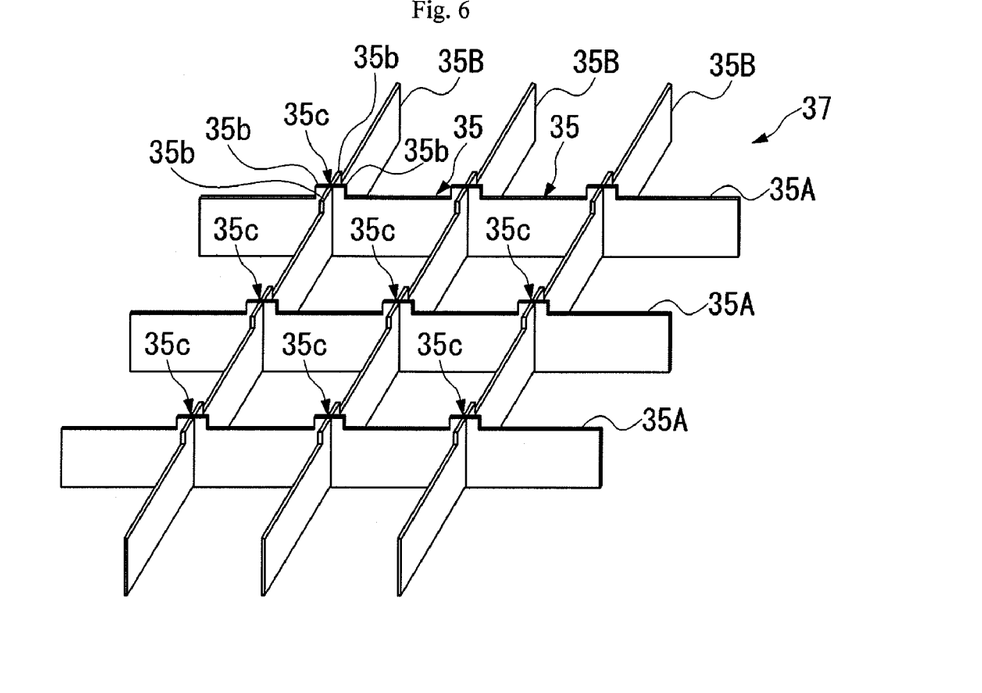
FIG. 6 is a perspective view of a partition used in a planar light-emitting device according to a third embodiment of the present invention.

FIG. 6 shows a partition 37 according to a third embodiment of the present invention. The partition 37 is formed by combining together a plurality of rectangular partition segments 35A and 35B in a lattice configuration in the same way as in the second embodiment. In the third embodiment, however, projections 35b are formed on the upper edges of the respective intersecting portions of the partition segments 35A and 35B. The partition segments 35A and 35B intersect one another crosswise at the projections 35b to support the sheet-shaped light-diffusing elements 3 and 4 at the projections 35b. Thus, a space is formed between the sheet-shaped light-diffusing element 3 and the partition 37 in each region between the adjacent intersecting portions of the partition segments 35A and 35B. This partition structure suppresses the occurrence of dark spots in the regions of exiting light along the upper edges of the partition 37.

Figure 7:
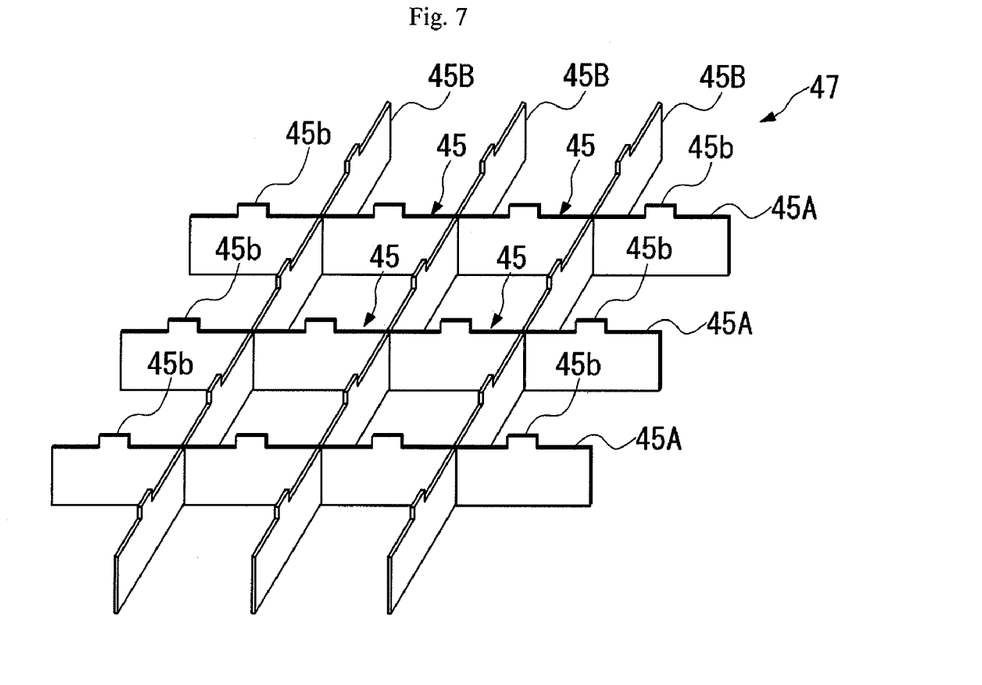
FIG. 7 is a perspective view of a partition used in a planar light-emitting device according to a fourth embodiment of the present invention.

FIG. 7 shows a partition 47 according to a fourth embodiment of the present invention. The partition 47 is also formed by combining together a plurality of rectangular partition segments 45A and 45B in a lattice configuration in the same way as in the second and third embodiments. In the fourth embodiment, however, projections 45b are formed at the centers between the intersections of the partition segments 45A and 45B. The sheet-shaped light-diffusing elements 3 and 4 are supported by the projections 45b.

Figure 8:
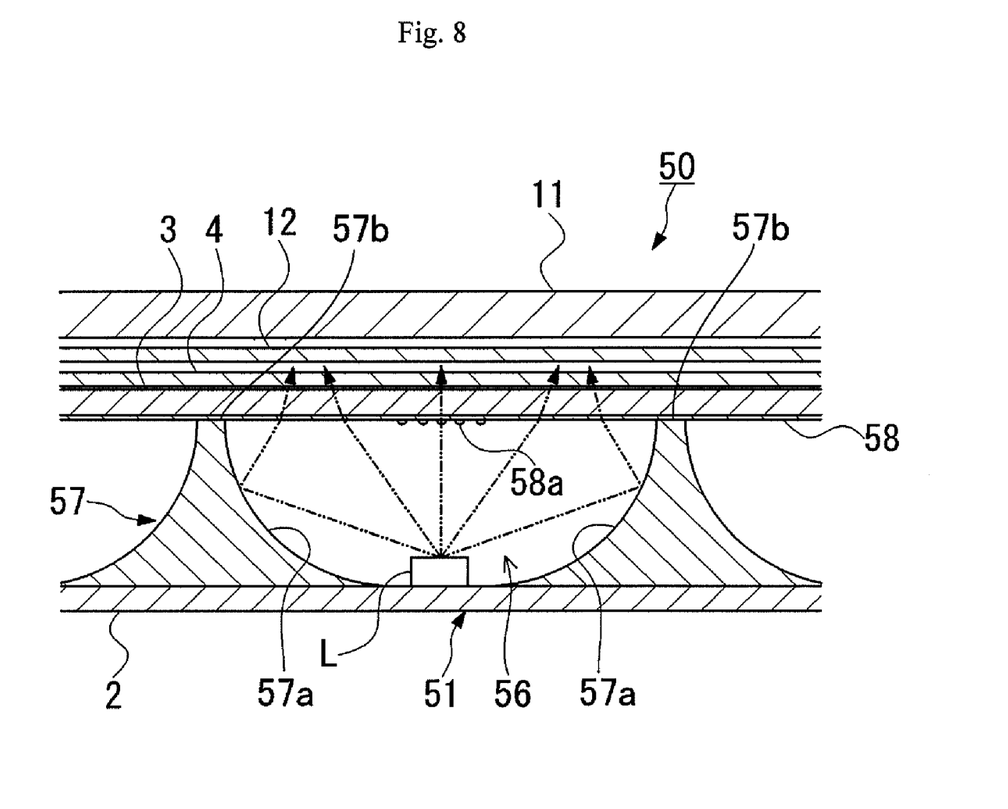
FIG. 8 is an enlarged sectional view of a main part of a liquid crystal display apparatus using a planar light-emitting device according to a fifth embodiment of the present invention.

FIG. 8 shows a fifth embodiment of the present invention. In the fifth embodiment, side surfaces 57a of a partition 57 that define each enclosed space 56 are curved slant surfaces extending from the upper edges 57b of the partition 57 to respective positions on the upper surface of the reflector 2, the respective positions that are adjacent to the associated light source L. Thus, the enclosed space 56 has a cup-shaped configuration as a whole. With this structure, the slant side surfaces 57a of the partition 57 direct light, which is emitted horizontally from the light source L, upwardly. Accordingly, the liquid crystal display apparatus 50 can efficiently use light from the light sources L. Although FIG. 8 shows an example in which the optical axis of light from the light source L extends vertically upward, it is also possible to direct light from the light source L horizontally and reflect the light upward by the side surfaces 57a of the partition 57.

In addition, a luminance control sheet (optical sheet) 58 of high light transmittance is placed on the upper edges 57b of the partition 57. The sheet-shaped light-diffusing elements 3 and 4 are placed over the luminance control sheet 58. White ink 58a is dot-printed on the luminance control sheet 58 at a region directly above each light source L. The white ink 58a prevents the occurrence of "hot spots", i.e. a phenomenon that the areas directly above the light sources L become particularly bright.

Although some embodiments of the present invention have been described above, the present invention is not limited to the foregoing embodiments but can be modified in a variety of ways without departing from the scope of the present invention.

For example, in the foregoing embodiments, the enclosed spaces have a square or rectangular frame shape. The enclosed spaces may have other polygonal frame shapes, e.g. a triangular or hexagonal frame shape. The partition may be silver in color by providing an evaporated silver or aluminum layer, for example, on the side surfaces of the partition.

As the light sources, it is also possible to use linear light sources such as cold-cathode tubes or other fluorescent lamps. RGB-LEDs may be used as the LED light sources to emit light of all colors. For example, it is possible to use an RGB-LED comprising a combination of a red LED element (R), a green LED element (G) and a blue LED element (B) mounted in one package. Alternatively, LED light sources emitting mutually different colors of light may be disposed in each enclosed space. In these cases, it is possible to illuminate the liquid crystal display panel or the like with various colors of light over the whole planar light-emitting device or for each illuminating unit by controlling the applied electric current for each LED.

Although two sheet-shaped light-diffusing elements are used in the foregoing embodiments, the number of sheet-shaped light-diffusing elements may be one or three or more. The sheet-shaped light-diffusing elements may be disposed between the prism sheet and the liquid crystal display panel. In this case, the sheet-shaped light-diffusing elements are supported by the upper edges of the partition through the prism sheet (optical sheet). Although one prism sheet is used in the foregoing embodiments, it is possible to use two prism sheets.

It should be noted that the present invention is not necessarily limited to the foregoing embodiment but can be modified in a variety of ways without departing from the gist of the present invention.

The invention claimed is:

1. A planar light-emitting device comprising:
a reflector having an upper surface serving as a light-reflecting surface;
a partition provided on the reflector to extend upward to form a plurality of enclosed spaces over the upper surface of the reflector, the partition having side surfaces that define the enclosed spaces and that are light-reflective;
light sources disposed in the enclosed spaces, respectively; and
at least one sheet-shaped light-diffusing element supported on upper edges of the partition to receive light from the light sources and to transmit and diffuse the light upward.

2. The planar light-emitting device of claim 1, wherein the upper edges of the partition are disposed in a plane parallel to the upper surface of the reflector.

3. The planar light-emitting device of claim 1, wherein a plurality of mutually spaced projections are formed on the upper edges of the partition to support the at least one sheet-shaped light-diffusing element by the projections.

4. The planar light-emitting device of claim 3, wherein the partition has a plurality of rectangular partition segments combined together in a lattice configuration to form the enclosed spaces, the mutually spaced projections being disposed at intersecting portions where the rectangular partition segments intersect one another.

5. The planar light-emitting device of claim 3, wherein the partition has a plurality of rectangular partition segments combined together in a lattice configuration to form the enclosed spaces, the mutually spaced projections being formed respectively at centers between intersections where the rectangular partition segments intersect one another.

6. The planar light-emitting device of claim 3, wherein the partition has first partition portions spaced from and parallel to one another and second partition portions spaced from and parallel to one another, the second partition portions perpendicularly intersecting the first partition portions to form, in cooperation with the first partition portions, the enclosed spaces arranged in a matrix, the partition having the mutually spaced projections at intersections where the first partition portions and the second partition portions intersect one another.

7. The planar light-emitting device of claim 3, wherein the partition has first partition portions spaced from and parallel to one another and second partition portions spaced from and parallel to one another, the second partition portions perpendicularly intersecting the first partition portions to form, in cooperation with the first partition portions, the enclosed spaces arranged in a matrix, the partition having the mutually spaced projections at centers between intersections where the first partition portions and the second partition portions intersect one another.

8. The planar light-emitting device of claim 1, wherein the partition is formed of a white resin.

9. The planar light-emitting device of claim 1, wherein the enclosed spaces are arranged in a matrix.

10. The planar light-emitting device of claim 1, wherein the partition is a single member molded out of a white resin, the enclosed spaces being arranged in a matrix.

11. The planar light-emitting device of claim 1, wherein the partition has a plurality of rectangular partition segments combined together in a lattice configuration to form the enclosed spaces.

12. The planar light-emitting device of claim 11, wherein the rectangular partition segments comprise two groups of rectangular partition segments intersecting one another in a lattice configuration, at least one of the two groups of rectangular partition segments having notches extending perpendicular to a longitudinal direction of the rectangular partition segments in the at least one group, an other of the two groups of rectangular partition segments being inserted into the notches and thus combined with the one of the two groups of rectangular partition segments in a lattice configuration.

13. The planar light-emitting device of claim 1, wherein the light sources are disposed on the upper surface of the reflector at respective centers of the enclosed spaces, the side surfaces of the partition that define the enclosed spaces being slant surfaces extending from the upper edges of the partition to respective positions on the upper surface of the reflector that are adjacent to the associated light sources.

14. The planar light-emitting device of claim 13, wherein the slant surfaces are upwardly concave curved surfaces.

15. The planar light-emitting device of claim 1, wherein the partition has a lattice structure, the enclosed spaces being arranged in a matrix of a plurality of columns and a plurality of rows.

16. A liquid crystal display apparatus comprising:
a liquid crystal display panel; and
the planar light-emitting device of claim 1, which is disposed at a back of the liquid crystal display panel.

* * * * *